US009164634B2

(12) United States Patent
Mo et al.

(10) Patent No.: US 9,164,634 B2
(45) Date of Patent: Oct. 20, 2015

(54) TOUCH SCREEN APPARATUS AND PROCESSING METHOD THEREOF

(71) Applicant: FocalTech Systems, Ltd., George Town, Grand Cayman (KY)

(72) Inventors: Lianghua Mo, Guangdong (CN); Jingkai Zhang, Guangdong (CN)

(73) Assignee: FocalTech Systems, Ltd., George Town, Grand Cayman (KY)

( * ) Notice: Subject to any disclaimer, the term of this patent is extended or adjusted under 35 U.S.C. 154(b) by 175 days.

(21) Appl. No.: 13/764,240

(22) Filed: Feb. 11, 2013

(65) Prior Publication Data

US 2014/0078099 A1  Mar. 20, 2014

(30) Foreign Application Priority Data

Sep. 20, 2012 (CN) .......................... 2012 1 0353316

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ....... G06F 3/044; G06F 3/0418; G06F 3/041; G06F 2203/04106; G06F 2203/04107; G06F 3/0412; G06F 3/0414; G06F 3/0416; G06F 3/045; G06F 1/1698; G06F 3/03545; G06F 3/0383; G06F 3/042; G06F 3/043; G06F 3/0433
USPC ................. 345/156–158, 168–169, 173–179; 178/18.01–18.09; 463/37–38
See application file for complete search history.

(56) References Cited

U.S. PATENT DOCUMENTS

| 7,031,886 | B1 | 4/2006 | Hargreaves | |
| 7,451,050 | B2 | 11/2008 | Hargreaves | |
| 8,659,556 | B2 | 2/2014 | Wilson | |
| 2005/0189154 | A1 | 9/2005 | Perski et al. | |
| 2008/0040079 | A1* | 2/2008 | Hargreaves | ................... 702/191 |
| 2008/0157893 | A1 | 7/2008 | Krah | |
| 2010/0060589 | A1 | 3/2010 | Wilson | |

(Continued)

FOREIGN PATENT DOCUMENTS

| CN | 101080689 A | 11/2007 |
| CN | 201281846 Y | 7/2009 |

(Continued)

OTHER PUBLICATIONS

First Chinese Office Action regarding Application No. 201210353316.X, dated Dec. 31, 2014. Translation obtained from Espacenet.com.

*Primary Examiner* — Md Saiful A Siddiqui
(74) *Attorney, Agent, or Firm* — Harness, Dickey & Pierce, P.L.C.

(57) ABSTRACT

A touch screen apparatus and a processing method thereof. In the touch screen apparatus according to the embodiment of the invention, a frequency spectrum analyzing unit determines that a frequency domain signal of a signal received by a receiving unit in the touch screen apparatus or of a signal obtained by processing the signal received by the receiving unit for at least once includes a predetermined noise signal feature, and then a frequency control unit controls the frequency of the signal sent by a sending unit, so that there is as little interference of the noise as possible when the sending unit performs transmission.

14 Claims, 4 Drawing Sheets

(56) References Cited

U.S. PATENT DOCUMENTS

| | | | |
|---|---|---|---|
| 2010/0321034 A1* | 12/2010 | Hargreaves | 324/612 |
| 2011/0042152 A1 | 2/2011 | Wu | |
| 2011/0063993 A1* | 3/2011 | Wilson et al. | 370/254 |
| 2013/0321323 A1* | 12/2013 | Salaverry | 345/174 |
| 2014/0092066 A1 | 4/2014 | Wilson | |

FOREIGN PATENT DOCUMENTS

| | | |
|---|---|---|
| CN | 102150111 A | 8/2011 |
| CN | 102662540 A | 9/2012 |

* cited by examiner

TOUCH SCREEN APPARATUS AND PROCESSING METHOD THEREOF

This application claims the priority of Chinese Patent Application 201210353316.X entitled "TOUCH SCREEN APPARATUS AND PROCESSING METHOD THEREOF", filed on Sep. 20, 2012 with State Intellectual Property Office of PRC. The aforementioned application is herein incorporated by reference in its entirety.

FIELD OF THE INVENTION

The present invention relates to the field of electronic device technology, and in particular to a touch screen apparatus and a processing method thereof.

BACKGROUND OF THE INVENTION

Touch screens for electronic devices are mainly divided into resistive touch screens and capacitive touch screens. With the increasing size of the screen used in the electronic device, the capacitive touch screen is more and more widely used. The electronic apparatus of the capacitive touch screen (hereinafter referred to as touch screen apparatus) includes a receiving unit for receiving a signal, a sending unit for sending a signal, a mutual capacitance connected between the receiving unit and the sending unit and a data processing and analyzing module. The mutual capacitance forms a part of the touch screen. The data processing and analyzing module can detect the mutual capacitance by analyzing the signal received by the receiving unit and determine whether the touch screen is touched.

However, the detection of the mutual capacitance by the touch screen apparatus is susceptible to noise, i.e. the signal received by the receiving unit includes both the noise and the signal sent by the sending unit, and it is difficult to distinguish the noise from the sent signal, so it is difficult to eliminate the influence of the noise on the sent signal by filtering, and the detection of the mutual capacitance is directly affected.

SUMMARY OF THE INVENTION

Embodiments of the invention provide a touch screen apparatus and a processing method thereof, so as to reduce the influence of the noise on the detection for the mutual capacitance.

An embodiment of the invention provides a touch screen apparatus, which includes a receiving unit, a sending unit, a demodulator, a mutual capacitance connected between the receiving unit and the sending unit and a data processing and analyzing module, and further includes a frequency spectrum analyzing unit and a frequency control unit; where:

an output terminal of the receiving unit is connected to an input terminal of the frequency spectrum analyzing unit, and the output terminal of the receiving unit is further connected to the data processing and analyzing module via the demodulator;

the frequency spectrum analyzing unit is configured to determine whether a frequency domain signal of a signal output by the receiving unit or a frequency domain signal of a signal obtained by processing the signal output by the receiving unit for at least once includes a predetermined noise signal feature; and the frequency control unit is connected between the frequency spectrum analyzing unit and a frequency control terminal of the sending unit and is configured to control a frequency of a signal sent by the sending unit when the frequency spectrum analyzing unit determines that a signal received by the receiving unit comprises a noise signal.

An embodiment of the invention provides a processing method for a touch screen apparatus, comprising:

acquiring a frequency domain signal of a signal received by a receiving unit in the touch screen apparatus, or acquiring a frequency domain signal of a signal obtained by processing the signal output by the receiving unit for at least once; and determining that the acquired frequency domain signal has a predetermined noise signal feature, and controlling a frequency of a signal sent by a sending unit in the touch screen apparatus so that the sending unit performs transmission according to the controlled frequency.

In the touch screen apparatus according to the embodiment of the invention, the frequency spectrum analyzing unit determines whether a frequency domain signal of a signal output by the receiving unit or of a signal obtained by processing the signal output by the receiving unit for at least once includes a predetermined noise signal feature, and if the frequency domain signal includes the predetermined noise signal feature, it means that a signal sent by the sending unit is interfered by the noise. Then the frequency control unit controls the frequency of the signal sent by the sending unit, so that there is as little interference of noise as possible when the sending unit sends the signal in the frequency band, thereby the impact of the noise on the mutual capacitance detection is reduced.

BRIEF DESCRIPTION OF THE DRAWINGS

Technical solutions of the embodiments of the present applicant or the prior art will be illustrated more clearly with the following brief description of the drawings. Apparently, the drawings referred in the following description constitute only some embodiments of the invention. Those skilled in the art may obtain some other drawings from these drawings without any creative work.

DETAILED DESCRIPTION OF THE INVENTION

The technical solution according to the embodiments of the present invention will be described clearly and completely as follows in conjunction with the accompany drawings in the embodiments of the present invention. It is obvious that the described embodiments are only a part of the embodiments according to the present invention. All the other embodiments obtained by those skilled in the art based on the embodiments in the present invention without any creative work belong to the scope of the present invention.

Figure 1:
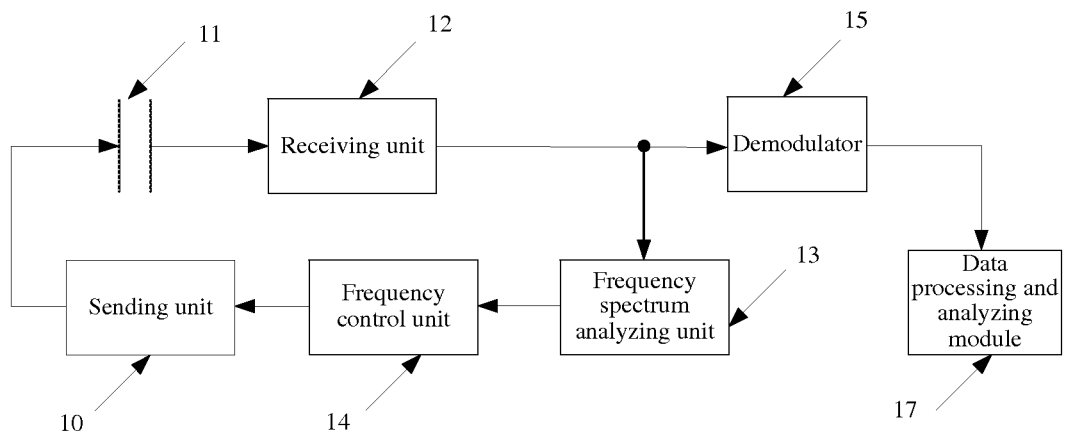
FIG. 1 is a schematic structural diagram of a touch screen apparatus according to an embodiment of the invention.

An embodiment of the invention provides a touch screen apparatus which is mainly an electronic device with a capacitive touch screen, for example, a mobile phone or a handheld computer etc. The schematic structural view of the touch screen apparatus is as shown in FIG. 1 and the touch screen apparatus includes a sending unit 10, a receiving unit 12, a demodulator 15, a data processing and analyzing module 17 and a mutual capacitance 11 connected between the receiving unit 12 and the sending unit 10, where the mutual capacitance 11 is a portion of the touch screen. The touch screen apparatus further includes a frequency spectrum analyzing unit 13 and a frequency control unit 14.

The output terminal of the receiving unit 12 is connected to (including directly or indirectly connection, although the direct connection is depicted in FIG. 1) the input terminal of the frequency spectrum analyzing unit 13, and the output terminal of the receiving unit 12 is also connected to the data processing and analyzing module 17 via the demodulator 15.

It can be understood that, in the touch screen apparatus, when a user performs a contact operation on the touch screen, the capacitance value of the mutual capacitance 11 changes, therefore the single sent by the sending unit 10 and received by the receiving unit 12 also changes. Therefore the data processing and analyzing module 17 in the touch screen apparatus may detect the capacitance value of the mutual capacitance 11 by analyzing a signal obtained after performing a processing (such as a demodulation processing and a filtering processing) on the signal received by the receiving unit 12, and therefore may determine the contact on the touch screen by the user and the specific position of the contact.

The frequency spectrum analyzing unit 13 is adapted to determine whether a frequency domain signal of a signal output by the receiving unit 12 or of a signal obtained by processing the signal output by the receiving unit for at least once 12 includes a predetermined noise signal feature. If the frequency domain signal includes the predetermined noise signal feature, the signal send by the sending unit 10 is interfered by the noise such that there is a noise signal existing in the signal received by the receiving unit 12; and if the frequency domain signal does not include the predetermined noise signal feature, there is not any noise signal existing in the signal received by the receiving unit 12. The predetermined noise signal feature refers to a feature of a signal which is received by the receiving unit 12 and which includes a noise signal in the case that the signal sent by the sending unit 10 is interfered by the noise, for example, the feature that the frequency domain signal peaks at an extra frequency in addition to the frequency of the direct current signal. The specific noise signal feature may be pre-configured by the user into the touch screen apparatus as required, and a noise signal feature corresponding to a signal directly output by the receiving unit 12 is different from a noise signal feature corresponding to a signal obtained by processing the signal output by the receiving unit 12.

Specifically, during the implementation of the above mentioned determining process, the frequency spectrum analyzing unit 13 needs to firstly acquire the frequency domain signal of the signal received by the receiving unit 12, or to firstly acquire the frequency domain signal of the signal obtained by processing the signal output by the receiving unit for at least once, specifically the frequency domain signal may be obtained through Fourier transform; then the frequency spectrum analyzing unit 13 may select to perform the determination on the frequency domain signal in the whole frequency band or in a part of the frequency band (for example, a frequency band of 0 to 500 kHz, or a frequency band of 20 kHz to 300 kHz) so as to reduce the amount of calculation of the frequency spectrum analyzing unit 13.

The frequency control unit 14 is connected between the frequency spectrum analyzing unit 13 and the frequency control terminal of the sending unit 10 and is adapted to control the frequency of the signal sent by the sending unit 10 when the frequency spectrum analyzing unit 13 determines that the signal received by the receiving unit 12 includes the noise signal. The present invention is not limited by the specific control strategy. However, it should be ensured that the frequency domain signal is determined by the frequency spectrum analyzing unit 13 as not including the predetermined noise signal feature after the frequency control unit 14 has controlled the frequency of the signal sent by the sending unit. In practice, the frequency control unit 14 can be implemented by a device such as a controllable oscillator or a programmable frequency controller.

The frequency control unit 14 controls the frequency of the sent signal preset in the touch screen apparatus by the user, for example controls the frequency of the signal sent by the sending unit 10 to fall into a frequency band in which the frequency spectrum analyzing unit 13 determines that the amplitude of the frequency domain signal does not peak.

It is noted that in the touch screen apparatus the frequency of the signal sent by the sending unit 10 may be continuously adjusted through the frequency spectrum analyzing unit 13 and the frequency control unit 14 until the frequency spectrum analyzing unit 13 determines that the frequency domain signal does not have the predetermined noise signal feature. The frequency control unit 14 and the frequency spectrum analyzing unit 13 function as a feedback circuit. Moreover, there may be some other modules in the touch screen apparatus, such as an analog-to-digital conversion unit adapted to perform analog-to-digital conversion on the signal output by the receiving unit 12. The analog-to-digital conversion unit can be connected downstream of the receiving unit 12 and can also be connected downstream of the demodulator 15 and upstream of the data processing and analyzing module 17.

As can be seen from above, in the touch screen apparatus according to the embodiment of the invention, the frequency spectrum analyzing unit 13 determines whether the frequency domain signal of the signal output by the receiving unit 12 or the frequency domain signal of the signal obtained by processing the signal output by the receiving unit 12 for at least once includes the predetermined noise signal feature, and if so, it means that the signal sent by the sending unit 10 is interfered by the noise. Then the frequency control unit 14 controls the frequency of the signal sent by the sending unit 10, so that there is as little interference of the noise as possible when the sending unit 10 sends the signal in the frequency band, thereby the impact of the noise on the mutual capacitance detection is reduced.

In the specific implementations of the embodiments, there may be the following ways for the output terminal of the receiving unit 12 to be connected to the input terminal of the frequency spectrum analyzing unit 13:

(1) As shown in FIG. 1, the input terminal of the frequency spectrum analyzing unit 13 is connected downstream of the output terminal of the receiving unit 12 and upstream of the demodulator 15. In this case, the predetermined noise signal feature may include a feature that in a frequency band which is centered at the signal frequency of the signal sent by the sending unit 10 and which has a width equal to a predetermined pass-band frequency, the frequency domain signal peaks at an extra frequency in addition to the centered signal frequency (i.e. the signal frequency of the signal sent by the sending unit 10).

In this embodiment, the frequency spectrum analyzing unit 13 is adapted to determine whether the frequency domain signal of the signal output by the receiving unit 12 peaks in the frequency band at any extra frequency in addition to the frequency of the sent signal, and to determine that the signal received by the receiving unit 12 includes the noise signal in a case that the frequency domain signal peaks in the frequency band at an extra frequency and otherwise determine that the signal received by the receiving unit 12 does not include the noise signal.

Figure 2:
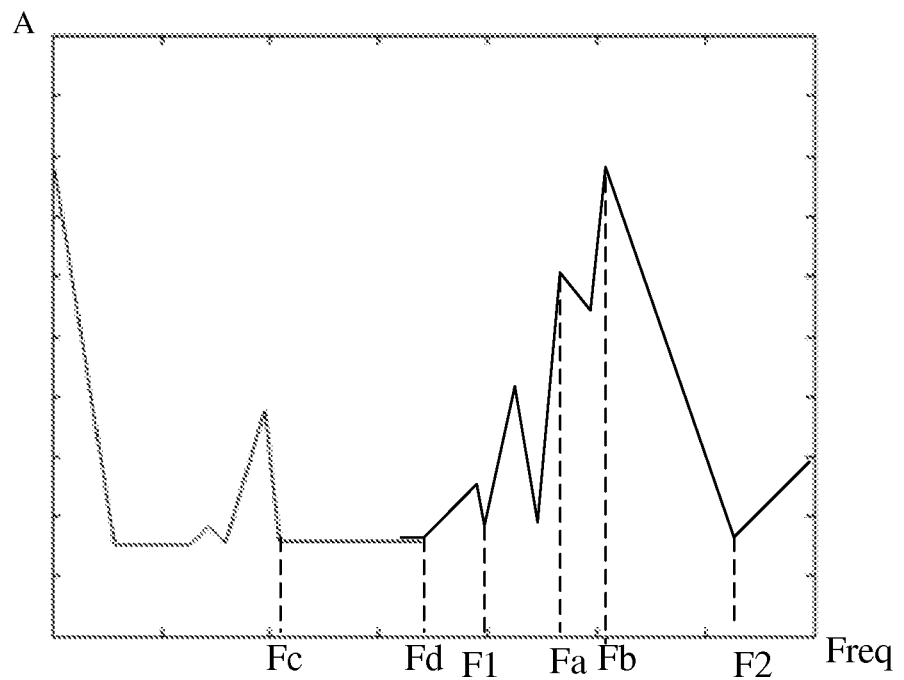
FIG. 2 is a frequency domain waveform diagram of a signal received by a receiving unit included in the touch screen apparatus according to the embodiment of the invention.

Fore example, FIG. 2 shows a frequency domain waveform diagram of the signal received by the receiving unit, with the abscissa being the frequency Freq and the ordinate being the amplitude A of the signal. It is assumed that the frequency band ranges from F1 to F2 and the frequency band is centered at the signal frequency Fb of the signal sent by the sending unit 10. If there is a peak appearing at an extra frequency such as the frequency Fa in the frequency band in addition to the peak at the signal frequency Fb, i.e., in addition to the direct current signal, it is indicated that there is a noise signal existing in the signal received by the receiving unit 12. In this case, the frequency control unit 14 may adjust the frequency of the signal sent by the sending unit 10 into a relatively clean frequency band, for example the frequency band between Fc and Fd, and then the spectrum analyzing unit 13 performs the judgment again.

Figure 3:
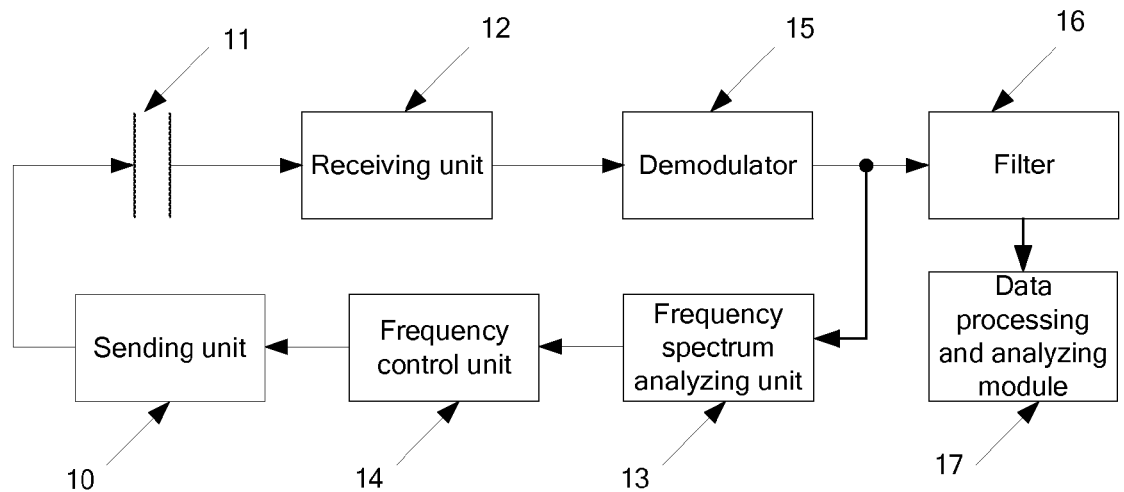
FIG. 3 is a schematic structural diagram of another touch screen apparatus according to an embodiment of the invention.

(2) As shown in FIG. 3, in addition to the structure shown in FIG. 1, the touch screen apparatus may further include a filter 16. The filter 16 is connected downstream of the demodulator 15, the output terminal of the receiving unit 12 is connected to the data processing and analyzing module 17 via the demodulator 15 and the filter 16, the input terminal of the frequency spectrum analyzing unit 13 is connected between the demodulator 15 and the filter 16. In this case, since the demodulation of a signal received by the receiving unit 12 means translating the received signal along frequency axis, the predetermined noise signal feature may include a feature that in a frequency band which is centered at a frequency obtained by subtracting a predetermined demodulation value B from the signal frequency of the signal sent by the sending unit 10 and which has a width equal to a pass-band frequency of the filter 16, the frequency domain signal peaks at an extra frequency in addition to the frequency obtained by subtracting the predetermined demodulation value B from the signal frequency of the signal sent by the sending unit. For example, assuming that the signal frequency of the signal sent by the sending unit 10 in the touch screen apparatus is Fb, it is needed to perform the judgment in the frequency band which is centered at Fb-B and which has a width equal to the pass-band frequency of the filter 16, where the predetermined demodulation value is determined by the amount for which the signal received by the reception unit 12 is moved by the demodulator 15.

In the present embodiment, the spectrum analyzing unit 13 is adapted to determine whether the frequency domain signal of a signal obtained by demodulating the signal output by the receiving unit 12 peaks in the frequency band which is centered at the frequency obtained by subtracting the demodulation value B from the signal frequency of the signal sent by the sending unit 10 at the extra frequency in addition to the frequency obtained by subtracting the predetermined demodulation value from the signal frequency of the signal sent by the sending unit 12, and to determine that the signal received by the receiving unit 12 includes the noise signal in a case that the frequency domain signal peaks in the frequency band at the extra frequency, or otherwise to determine that the signal received by the receiving unit 12 does not include the noise signal.

Figure 4:
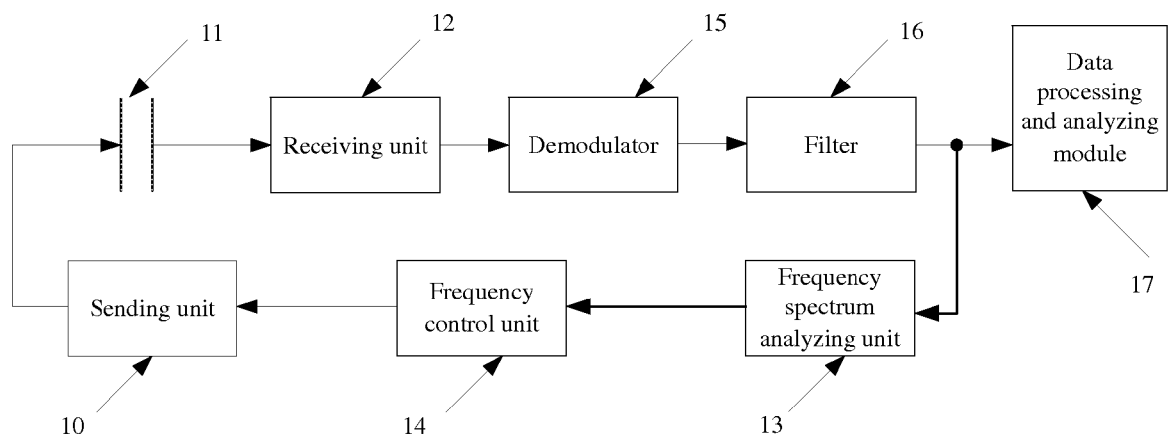
FIG. 4 is a schematic structural diagram of yet another touch screen apparatus according to an embodiment of the invention.

(3) As shown in FIG. 4, the input terminal of the frequency spectrum analyzing unit 13 is connected between the filter 16 and the data processing and analyzing module 17. In this case, the predetermined noise signal feature may include a feature that there is a peak appearing at an extra frequency in addition to a peak (i.e. a direct current signal) appearing at a zero frequency point.

Figure 5:
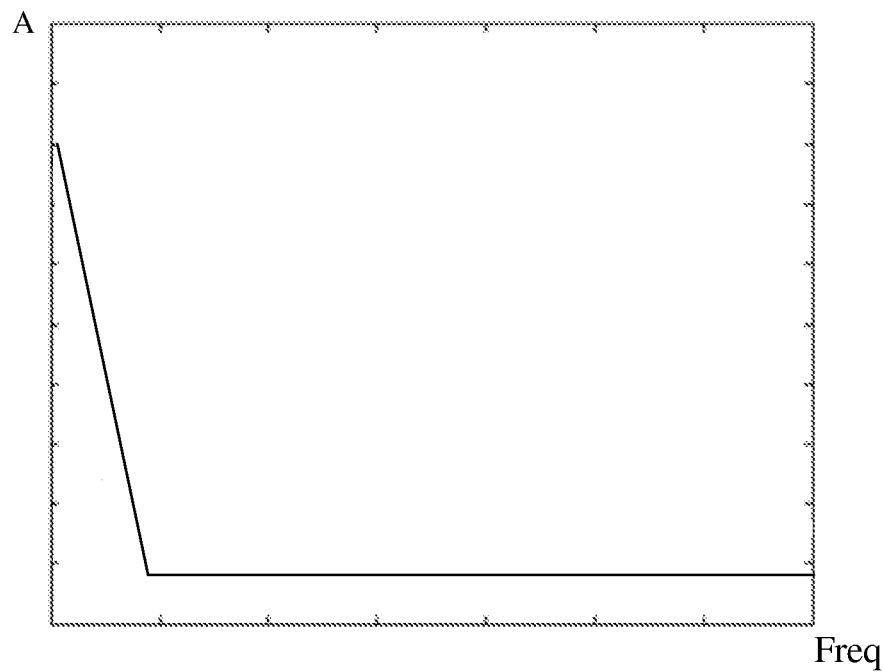
FIG. 5 is a frequency domain waveform diagram of a signal obtained after demodulation and filtering of the signal received by the receiving unit included in the touch screen apparatus according to the embodiment of the invention.
Figure 6:
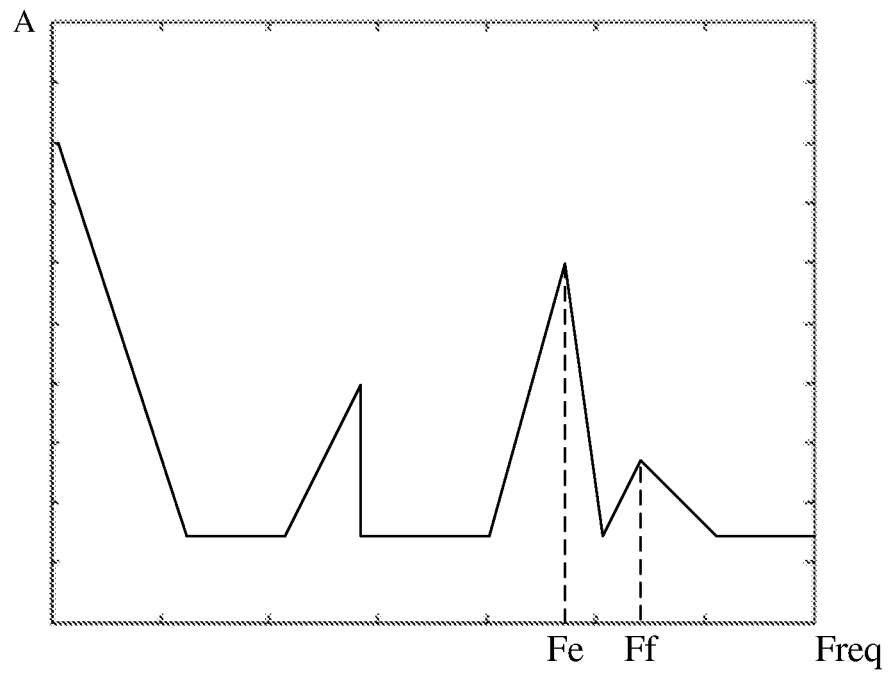
FIG. 6 is another frequency domain waveform diagram of a signal obtained after demodulation and filtering of the signal received by a receiving unit included in the touch screen apparatus according to the embodiment of the invention.

In the present embodiment, the spectrum analyzing unit 13 is adapted to determine whether the frequency domain signal of a signal obtained by demodulating and filtering the signal output by the receiving unit 12 peaks at the extra frequency in addition to the zero frequency point. If the frequency domain signal of the signal obtained by demodulating and filtering the signal output by the receiving unit 12 does not peak at the extra frequency in addition to the zero frequency point, it is determined that there is not any noise signal existing in the signal received by the receiving unit 12. For example, FIG. 5 shows the frequency domain waveform diagram of the signal obtained after the demodulation and filtering of the signal received by the receiving unit with the abscissa being the frequency Freq and the ordinate being the amplitude A of the signal, and there is only a direct current signal i.e. a peak at the zero frequency point. If the frequency domain signal peaks at the extra frequency in addition to the zero frequency point, it is determined that there is a noise signal existing in the signal received by the receiving unit 12. For example, FIG. 6 shows a frequency domain waveform diagram of the signal obtained after the demodulation and filtering of the signal received by the receiving unit 12, and there are peak value signals at other frequency points for example at frequency points Fe and Ff in addition to the direct current signal.

It should be noted that the frequency control unit 14 controls the sending unit 10 to continuously adjust the frequency of the sent signal, so that frequencies of signals sent by the sending unit 10 at different time instants are different. Therefore, the data processing and analyzing module 17 can determine the frequency of the noise signal according to signals obtained after the demodulation and filtering of signals received by the receiving unit 12 and acquired at least two different time instants. The method for determining the frequency of the noise signal may include: when the sending unit 10 performs transmission in frequency band F1, if the frequency spectrum analyzing unit 13 analyzes and determines that in the frequency band F2 the frequency domain signal of the signal received by the receiving unit 12 does not include any noise signal feature, i.e. there is not any peak, it is determined that there will not be any noise interference when the sending unit 10 performs transmission in frequency band F2. Similarly, the sending unit 10 may send a signal in frequency band F2, the frequency spectrum analyzing unit 13 may determine whether there is any noise signal feature in the frequency band F1, and thereby it is determined whether there will be any noise interference when the sending unit 10 performs transmission in frequency band F1.

Figure 7:
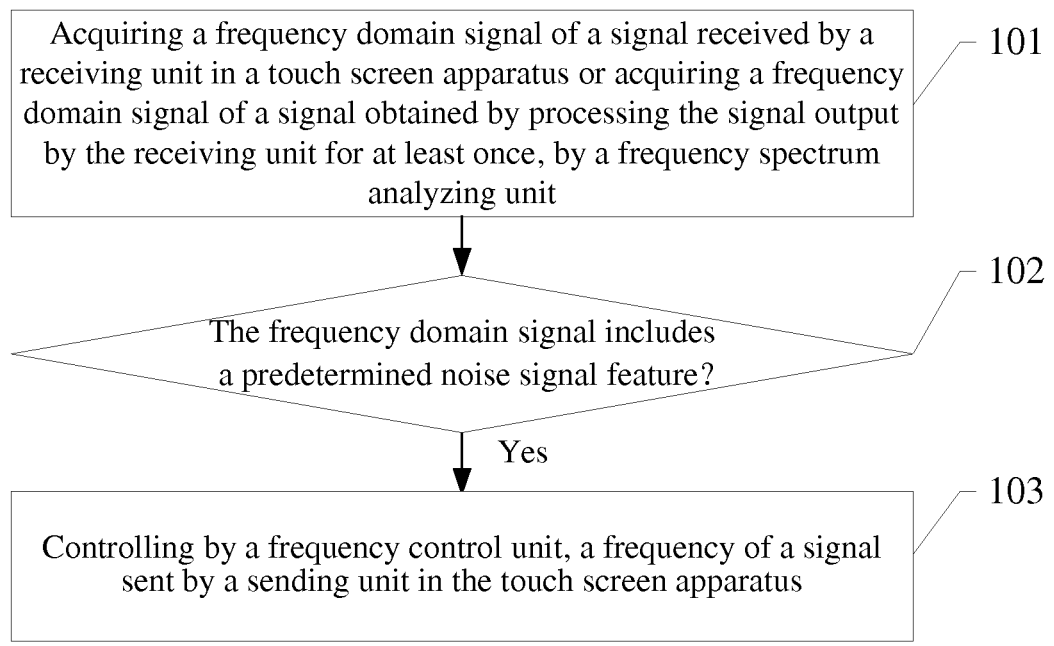
FIG. 7 is a flow chart of the processing method of the touch screen apparatus according to the embodiment of the invention.

Embodiments of the invention further provides a processing method for the touch screen apparatus, which is a processing method applicable for the touch screen apparatuses as shown in FIGS. 1, 3 and 4. The method, of which the flow chart is shown in FIG. 7, includes the following steps.

Step 101, the frequency spectrum analyzing unit 13 acquires a frequency domain signal of a signal received by a receiving unit 12 in the touch screen apparatus, or acquires a frequency domain signal of a signal obtained by processing the signal received by the receiving unit 12 for at least once. The frequency domain signal may be obtained for example by Fourier transform. Step 102 may be performed on the frequency domain signal in the whole or a part of the frequency band.

Step 102, the frequency spectrum analyzing unit 13 determines whether the frequency domain single acquired in Step 101 includes a predetermined noise signal feature; if the frequency domain single includes the noise signal feature, it means that the signal sent by the sending unit 10 is interfered by the noise, then Step 103 is performed; and if the frequency domain single does not include the noise signal feature, then Step 103 is not performed, and the sending unit 10 sends signal at the original frequency.

If the frequency domain signal of the signal received by the receiving unit 12 is acquired in Step 101, the predetermined noise signal feature may include a feature that in a frequency band which is centered at the signal frequency of the signal sent by the sending unit in the touch screen apparatus and which has a width equal to a predetermined pass-band frequency, the frequency domain signal peaks at an extra frequency in addition to the signal frequency; if a frequency domain signal of a signal obtained after demodulation of the signal received by the receiving unit 12 is acquired in Step 101, the predetermined noise signal feature comprises a feature that in a frequency band which is centered at a frequency obtained by subtracting a predetermined demodulation value from a signal frequency of the signal sent by the sending unit in the touch screen apparatus and which has a width equal to a pass-band frequency of the filter, the frequency domain signal peaks at an extra frequency in addition to the frequency obtained by subtracting the predetermined demodulation value from the signal frequency of the signal sent by the sending unit; and if a frequency domain signal of a signal obtained after demodulation and filtering of the signal received by the receiving unit 12 is acquired in Step 101, the predetermined noise signal feature comprises a feature that the frequency domain signal peaks at an extra frequency in addition to a zero frequency point.

Step 103, the frequency control unit 14 controls the frequency of the signal sent by the sending unit 10 in the touch screen apparatus, so that the frequency domain signal is determined by the spectrum analyzing unit 13 as not having any predetermined noise signal feature when the sending unit 10 performs transmission according to the controlled frequency, thereby the data processing and analyzing module 17 may detect the capacitance value of the mutual capacitance 11 according to the signal obtained after the demodulation and filtering of the signal received by the receiving unit 12, and the detection will not be affected by the noise.

In the method according to the embodiment of the invention, the frequency spectrum analyzing unit 13 determines whether a frequency domain signal of a signal output by the receiving unit 12 or a frequency domain signal of a signal obtained by processing the signal output by the receiving unit for at least once 12 includes a predetermined noise signal feature, and if the frequency domain single includes the noise signal feature, it means that a signal sent by the sending unit 10 is interfered by the noise. Then the frequency control unit 14 controls the frequency of the signal sent by the sending unit 10, so that there is as little interference of the noise as possible when the sending unit 10 performs transmission in the frequency band, thereby the impact of the noise on the mutual capacitance detection is reduced.

In an embodiment, when the touch screen apparatus performs the Steps 101 to 103, the frequencies of signals sent by the sending unit 10 at different time instants are different.

Therefore, the data processing and analyzing module 17 can determine the frequency of the noise signal according to signals obtained after the demodulation and filtering of signals received by the receiving unit 12 and acquired at least two different time instants. The method for determining the frequency of the noise signal is as described above in the embodiment for the apparatus and will not be described in detail herein.

It can be understood by the skilled in the art that all or some of the steps of the methods according to above mentioned embodiments can be performed by corresponding hardware under instruction of programs. The program may be stored in a computer readable storage medium which may include a read only memory (ROM), a random access memory (RAM), a disc or an optical disc and so on.

The touch screen apparatuses and the processing methods thereof according to the embodiments of the invention have been descried in detail herein. The principle and the embodiments of the invention have been descried in conjunction with the specific examples of the present invention. The illustration of the above mentioned embodiments is just used for helping to understand the method and the core concept of the present invention. Moreover, changes may be made to the specific embodiments and their application ranges by the skilled in the art in light of the concept of the present invention. Therefore, the content in this specification should not be understood as limiting the present invention.

The invention claimed is:

1. A touch screen apparatus comprising a receiving unit, a sending unit, a demodulator, a mutual capacitance connected between the receiving unit and the sending unit, and a data processing and analyzing module, wherein the touch screen apparatus further comprises a frequency spectrum analyzing unit and a frequency control unit;

an output terminal of the receiving unit is connected to an input terminal of the frequency spectrum analyzing unit, and the output terminal of the receiving unit is further connected to the data processing and analyzing module via the demodulator;

the frequency spectrum analyzing unit is configured to determine whether a frequency domain signal of a signal output by the receiving unit or of a signal obtained by processing the signal output by the receiving unit for at least once comprises a predetermined noise signal feature; and the frequency control unit is connected between the frequency spectrum analyzing unit and a frequency control terminal of the sending unit and is configured to control a frequency of a signal sent by the sending unit when the frequency spectrum analyzing unit determines that a signal received by the receiving unit comprises a noise signal;

wherein the touch screen apparatus further comprises a filter, wherein the filter is connected downstream of the demodulator, the input terminal of the frequency spectrum analyzing unit is connected between the demodulator and the filter, and the output terminal of the receiving unit is connected to the data processing and analyzing module via the demodulator and the filter;

the predetermined noise signal feature comprises a feature that in a frequency band which is centered at a frequency obtained by subtracting a predetermined demodulation value from a signal frequency of the signal sent by the sending unit and has a width equal to a pass-band frequency of the filter, a frequency domain signal peaks at an extra frequency, in addition to the frequency, obtained by subtracting the predetermined demodulation value from the signal frequency of the signal sent by the sending unit; and the frequency spectrum analyzing unit is configured to determine whether the frequency domain signal of a signal obtained by demodulating the signal output by the receiving unit peaks in the frequency band at an extra frequency in addition to the frequency obtained by subtracting the predetermined demodulation value from the signal frequency of the signal send by the sensing unit, and to determine that the signal received by the receiving unit comprises the noise signal in a case that the frequency domain signal of the signal obtained by demodulating the signal output by the receiving unit peaks in the frequency band at the extra frequency in addition to the frequency obtained by subtracting the predetermined demodulation value from the signal frequency of the signal sent by the sending unit.

2. The touch screen apparatus according to claim 1, wherein the input terminal of the frequency spectrum analyzing unit is connected downstream of the output terminal of the receiving unit and upstream of the demodulator; the predetermined noise signal feature comprises a feature that in a frequency band which is centered at a signal frequency of the signal sent by the sending unit and has a width equal to a predetermined pass-band frequency, the frequency domain signal peaks at an extra frequency in addition to the signal frequency; and the frequency spectrum analyzing unit is configured to determine whether the frequency domain signal peaks in the frequency band at the extra frequency in addition to the signal frequency, and to determine that the signal received by the receiving unit comprises the noise signal in a case that the frequency domain signal peaks in the frequency band at the extra frequency in addition to the signal frequency.

3. The touch screen apparatus according to claim 2, wherein the data processing and analyzing module is configured to determine the frequency of the noise signal according to at least two signals obtained after demodulation and filtering of signals received by the receiving unit and acquired at different time instants.

4. The touch screen apparatus according to claim 1, wherein the input terminal of the frequency spectrum analyzing unit is connected between a filter and the data processing and analyzing module, the predetermined noise signal feature comprises a feature that the frequency domain signal peaks at an extra frequency in addition to a zero frequency point; and the frequency spectrum analyzing unit is configured to determine whether the frequency domain signal of a signal obtained by demodulating and filtering the signal output by the receiving unit peaks at the extra frequency in addition to the zero frequency point, and to determine that the signal received by the receiving unit comprises the noise signal in a case that the frequency domain signal of the signal obtained by demodulating and filtering the signal output by the receiving unit peaks at the extra frequency in addition to the zero frequency point.

5. The touch screen apparatus according to claim 4, wherein the data processing and analyzing module is configured to determine the frequency of the noise signal according to at least two signals obtained after demodulation and filtering of signals received by the receiving unit and acquired at different time instants.

6. The touch screen apparatus according to claim 1, wherein the data processing and analyzing module is configured to determine the frequency of the noise signal according to at least two signals obtained after demodulation and filtering of signals received by the receiving unit and acquired at different time instants.

7. A processing method for a touch screen apparatus, comprising:

acquiring a frequency domain signal of a signal received by a receiving unit in the touch screen apparatus or of a signal obtained by processing the signal received by the receiving unit for at least once when the touch screen apparatus detects a mutual capacitance; and determining that the acquired frequency domain signal comprises a predetermined noise signal feature, and controlling a frequency of a signal sent by a sending unit in the touch screen apparatus so that the sending unit sends the signal according to the controlled frequency, wherein:

in response to acquiring the frequency domain signal of the signal received by the receiving unit, the predetermined noise signal feature comprises a feature that in a frequency band which is centered at a signal frequency of the signal sent by the sending unit in the touch screen apparatus and has a width equal to a predetermined pass-band frequency, the frequency domain signal peaks at an extra frequency in addition to the signal frequency;

in response to acquiring the frequency domain signal of a signal obtained by demodulating the signal received by the receiving unit, the predetermined noise signal feature comprises a feature that in a frequency band which is centered at a frequency obtained by subtracting a predetermined demodulation value from the signal frequency of the signal sent by the sending unit in the touch screen apparatus and has a width equal to a pass-band frequency of a filter, the frequency domain signal peaks at an extra frequency in addition to the frequency obtained by subtracting the predetermined demodulation value from the signal frequency of the signal sent by the sending unit; and in response to acquiring the frequency domain signal of a signal obtained by demodulating and filtering the signal received by the receiving unit, the predetermined noise signal feature comprises a feature that the frequency domain signal peaks at an extra frequency in addition to a zero frequency point.

8. The method according to claim 7, further comprising determining a frequency of the noise signal according to at least two signals obtained after demodulation and filtering of signals received by the receiving unit and acquired at least two different time instants.

9. A touch screen apparatus comprising a receiving unit, a sending unit, a demodulator, a mutual capacitance, a data processing and analyzing module, a frequency spectrum analyzing unit and a frequency control unit; wherein:

when the touch screen apparatus detects the mutual capacitance, the receiving unit receives a noise from the mutual capacitance and a signal sent by the sending unit via the mutual capacitance, and the receiving unit sends the noise and the signal sent by the sending unit to the data processing and analyzing module via the demodulator and to the frequency spectrum analyzing unit; the frequency spectrum analyzing unit acquires a frequency domain signal of a signal received by the receiving unit in the touch screen apparatus or of a signal obtained by processing the signal received by the receiving unit for at least once; and determines that the acquired frequency domain signal comprises a predetermined noise signal feature, and controls a frequency of a signal sent by the sending unit in the touch screen apparatus to make the sending unit send the signal to the sending unit according to the controlled frequency, wherein the touch screen apparatus further comprising a filter, wherein the receiving unit sends the noise and the signal sent by the sending unit to the frequency spectrum analyzing unit and to the filter via the demodulator;

the predetermined noise signal feature comprises a feature that in a frequency band which is centered at a frequency obtained by subtracting a predetermined demodulation value from a signal frequency of the signal sent by the sending unit and has a width equal to a pass-band frequency of the filter, the frequency domain signal peaks at an extra frequency in addition to the frequency obtained by subtracting the predetermined demodulation value from the signal frequency of the signal sent by the sending unit; and the frequency spectrum analyzing unit is configured to determine whether the frequency domain signal of a signal obtained by demodulating the signal output by the receiving unit peaks in the frequency band at the extra frequency in addition to the frequency obtained by subtracting the predetermined demodulation value from the signal frequency of the signal sent by the sending unit, and to determine that the signal received by the receiving unit comprises the noise signal in a case that the frequency domain signal of the signal obtained by demodulating the signal output by the receiving unit peaks in the frequency band at the extra frequency in addition to the frequency obtained by subtracting the predetermined demodulation value from the signal frequency of the signal sent by the sending unit.

10. The touch screen apparatus according to claim 9, wherein the predetermined noise signal feature comprises a feature that in a frequency band which is centered at a signal frequency of the signal sent by the sending unit and has a width equal to a predetermined pass-band frequency, the frequency domain signal peaks at an extra frequency in addition to the signal frequency; and the frequency spectrum analyzing unit is configured to determine whether the frequency domain signal peaks in the frequency band at the extra frequency in addition to the signal frequency, and to determine that the signal received by the receiving unit comprises the noise signal in a case that the frequency domain signal peaks in the frequency band at the extra frequency in addition to the signal frequency.

11. The touch screen apparatus according to claim 10, wherein the data processing and analyzing module is configured to determine the frequency of the noise signal according to at least two signals obtained after demodulation and filtering of signals received by the receiving unit and acquired at different time instants.

12. The touch screen apparatus according to claim 9, wherein the receiving unit sends the noise and the signal sent by the sending unit to the frequency spectrum analyzing unit and to data processing and analyzing module via the demodulator and a filter, the predetermined noise signal feature comprises a feature that the frequency domain signal peaks at an extra frequency in addition to a zero frequency point; and the frequency spectrum analyzing unit is configured to determine whether the frequency domain signal of a signal obtained by demodulating and filtering the signal output by the receiving unit peaks at the extra frequency in addition to the zero frequency point, and to determine that the signal received by the receiving unit comprises the noise signal in a case that the frequency domain signal of the signal obtained by demodulating and filtering the signal output by the receiving unit peaks at the extra frequency in addition to the zero frequency point.

13. The touch screen apparatus according to claim 12, wherein the data processing and analyzing module is configured to determine the frequency of the noise signal according to at least two signals obtained after demodulation and filtering of signals received by the receiving unit and acquired at different time instants.

14. The touch screen apparatus according to claim 9, wherein the data processing and analyzing module is configured to determine the frequency of the noise signal according to at least two signals obtained after demodulation and filtering of signals received by the receiving unit and acquired at different time instants.

* * * * *